Jan. 7, 1964  J. P. BAGBY  3,116,674
MAGNETIC OVERRIDE MECHANISM FOR CAMERA IRIS
Filed June 27, 1962
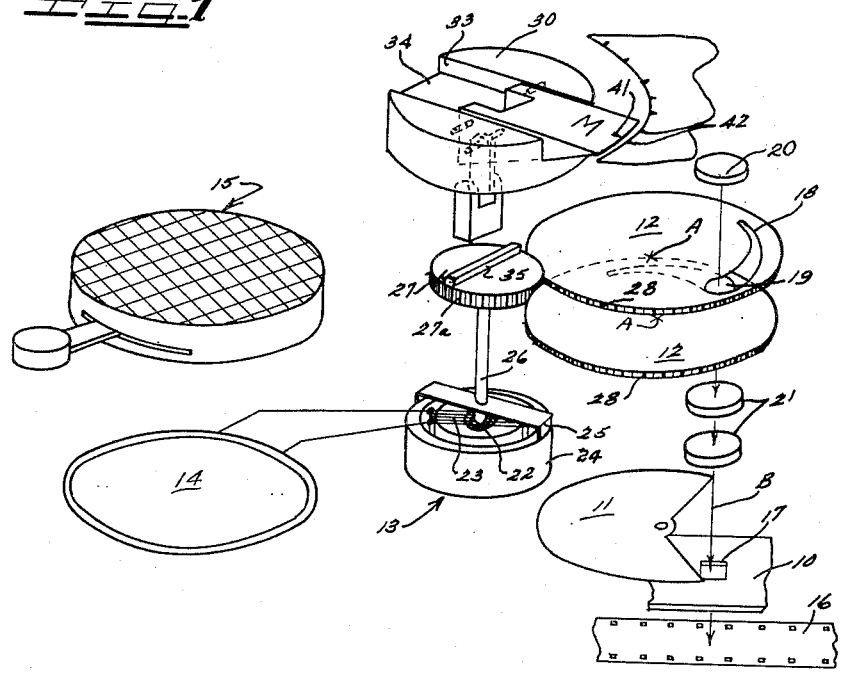
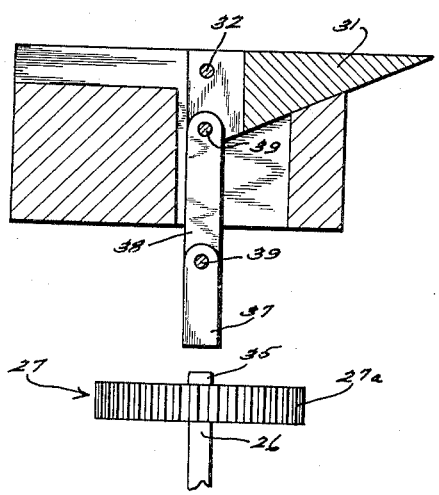
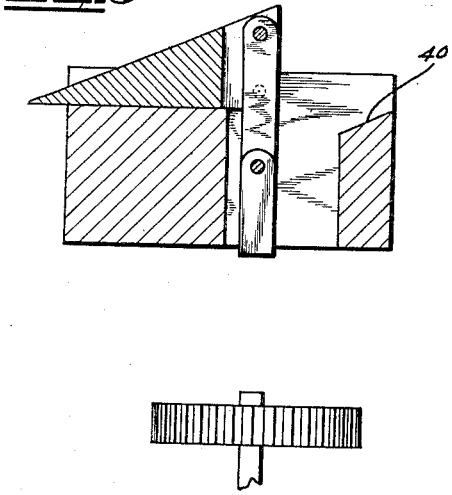
INVENTOR.
JOHN P. BAGBY
BY
ATTORNEYS 3,116,674
MAGNETIC OVERRIDE MECHANISM FOR
CAMERA IRIS
John P. Bagby, Pacific Palisades, Calif., assignor to
Bell & Howell Company, Chicago, Ill., a corporation
of Illinois
Filed June 27, 1962, Ser. No. 205,674
7 Claims. (Cl. 95—64)

This invention relates to photographic cameras and more particularly relates to a combined manual and automatic means for controlling the effective area of the diaphragm opening therein.

Heretofore, many and varied means have been devised for controlling the effective area of a diaphragm opening for selectively restricting and enlarging the cross-sectional area of the light passage intermediate to the light receiving camera aperture and the film to be exposed. Such means have generally comprised a plurality of relatively movable iris members which are selectively movable to restrict or enlarge the diaphragm opening. Manual and, later, automatic means have been devised to effect the desired movement of the iris members.

Prior devices for automatically regulating the area of the adjustable diaphragm opening have generally comprised a plurality of iris blades for defining the diaphragm opening, a photoelectric cell, and motor means drivingly associated with the blades and energized through the photoelectric cell for controllably moving the blades in direct proportion to the intensity of light impinging on the cell.

It has however been found desirable to incorporate a means for effecting manual adjustment of an otherwise automatically actuable mechanism so that a camera embodying such a mechanism can be used for special effects and so that inaccuracies, if any, in the camera exposure mechanism can be corrected.

Such manually operable mechanisms may comprise a pure override mechanism in which manual movement of the blades is effected in opposition to the bias of the motor means or galvanometer for automatically moving the iris-forming members or may be arranged so that manual actuation of the iris blades acts to uncouple or deenergize the motor means. The mechanism which is here disclosed is of extreme simplicity and yet can be adapted to operate in either manner as desired.

The device shown in the drawings which forms an embodiment of my invention includes a pair of iris-forming members or iris blades which are rotatably mounted within the camera body and which have the well known teardrop apertures formed therein which are cooperable to define a diaphragm opening substantially coaxially aligned with the camera exposure aperture. The iris blades are rotated by means of another rotary member or a gear disk which is engageable therewith and which is rotatably mounted within the camera on an axis parallel to the axes of the iris-forming blades. The gear disk is connected to the coil of a galvanometer and is rotatable therewith and a torsion spring may be provided to bias the coil and the connected gear disk in one direction. The galvanometer is electrically connected with a photoelectric cell which is exposed to the light ambient to the camera so that the galvanometer coil and connected gear disk will be rotated in opposition to the torsion spring bias as the intensity of light impinging on the photoelectric cell increases in a manner which is well known to those versed in this art.

A bar magnet is mounted on the face of the gear disk and another bar magnet is positionable in close proximity to the disk mounted magnet and is rotatably mounted in the camera so that as the rotatably mounted magnet rotates, the magnetic attractive effect of the magnets upon one another will cause the gear disk to be rotated in a like manner and in substantially the same degree.

The rotatably mounted bar magnet is suspended from a circular block which, in turn, is rotatably mounted within the camera. When the block is rotated and the suspended magnet is positioned in close proximity to the disk mounted magnet, the gear disk will be rotated with the block and will, of course, effect rotation of the iris forming members as has been explained above.

The suspension linkage for the suspended magnet is devised so that the suspended magnet can be moved relatively away from the gear disk until the magnetic attractive effect of the magnets upon one another is nullified simply by the spacing between these magnets.

In this manner, the suspended magnet can be moved into proximity with the gear disk in those isolated instances in which manual control of the diaphragm opening is desired. At all other times the suspended magnet can be moved relatively away from the gear disk so that it is ineffective in determining the rotative position thereof and the gear disk will then be free to rotate under the inducement of the galvanometer.

If desired, the system may be arranged so that magnetically induced movement of the gear disk simply overrides any bias from the galvanometer or can be arranged so that the photoelectric cell-galvanometer circuit is broken when the suspended magnet is dropped down into proximity with the gear disk.

It will further be appreciated that a magnetically oriented gear disk per se could be provided rather than one having a bar magnet mounted thereon and that means other than those shown in the drawings might be employed to nullify the magnetic attractive effect of the suspended magnet on the gear disk. For instance, a shield might be interposed between the suspended magnet and the gear disk when galvanometer induced motion of the gear disk was desired.

It should also be clearly understood that while the mechanism which I have illustrated in the drawings for effecting manual control of the iris-forming members is shown in combination with an automatic exposure control system including a photoelectric cell and a galvanometer, the means which I have shown for effecting rotation of the gear disk might also be successfully employed in a completely manually actuatable exposure control system.

In view of the foregoing it is a principal object of this invention to provide an improved means for effecting rotation of a rotary member by rotation of another member not mechanically coupled therewith and more specifically to provide an improved means for effecting adjustment of the diaphragm opening in a photographic camera.

Yet another object of this invention resides in the provision of a device wherein manually actuatable magnetically induced or automatically actuatable galvanometer induced movement of an iris gear train can be effected.

These and other objects of the invention will appear from time to time as the following specification proceeds and with reference to the accompanying drawings, wherein:

FIGURE 1 is an exploded partially diagrammatic view of a combined manual and automatic exposure control system formed in accordance with this invention;

FIGURE 2 is a fragmentary vertical sectional view through a portion of the mechanism shown in FIGURE 1; and FIGURE 3 is a fragmentary vertical sectional view which is similar in nature to FIGURE 2 but which shows several of the parts of the mechanism in a different position.

The exploded view of FIGURE 1 shows an exposure control mechanism constructed in accordance with the principles of this invention which comprises generally a guide plate 10, a rotary shutter 11, a pair of iris-forming elements 12, a galvanometer 13, and a photoelectric cell 14 having a combination adjustable baffle and reticular lens 15 positioned in front of the cell 14. The parts here described are common to many automatic exposure control systems now familiar to those skilled in this art and require no further detailed explanation.

A standard motion picture film 16 is guided against the rear face of the plate 10 which, in turn, is provided with an exposure aperture 17 therein which is conformable in configuration with a standard motion picture frame, and through which successive frames of the film are exposed as the film is intermittently fed through an exposure guide. The rotary shutter 11 is disposed immediately in front of the guide plate 10 and is rotated in timed relation with the intermittent feed of the film to cover the exposure aperture 17 during the film feed intervals in a manner which is also well known to those adept in this art.

The iris-forming elements 12 are circular in configuration and have teardrop openings 18 formed therein and are pivotally mounted at their center axes "A" within the camera in overlapping relationship so that the mating portions of the teardrop apertures 18 will cooperate to define a diaphragm opening 19. The various parts of the mechanism are so arranged within the camera body that the diaphragm opening 19 is substantially coaxially aligned with the center axis "B" of a light passage through the camera. The light passage extends from a light gathering lens 20 through the diaphragm opening 19 defined by the iris-forming elements 12 and thence through a series of lenses 21 and through the aperture 17 in the plate 10. Light passing from the lens 20 along this passage is impinged on the film 16 to form the image thereon in a well known manner.

The galvanometer is of usual construction and includes one or more spiral springs 22 effective to spring bias the pivoted rectangular circuit coil 23 to a zero position. The galvanometer includes a ring 24 of magnetic material surrounding the coil and serving to concentrate the magnetic field of the magnet. The galvanometer is so positioned that the pivotal axis of the coil is normal to the plane of the exposure aperture 17.

The forwardly facing photoelectric cell 14 is mounted in the camera and may have, as shown, a combination of adjustable light controlling baffle and reticular lens 15 mounted in front of the cell.

The circuit coil of the galvanometer is connected in circuit with the photoelectric cell 14 so that the coil is deflected from its spring biased zero position by current derived from the photoelectric cell in proportion to the intensity of light impinging on the photoelectric cell. It will be understood that ordinarily the photoelectric cell-galvanometer circuit is completed by a connection between one terminal of the circuit coil 23 and a terminal of the photo-electric cell 14 and by connecting the opposite terminals of each of these elements to ground. If desired, resistances may be provided in the circuit to compensate for the positive temperature coefficient of resistance of the photoelectric cell and galvanometer circuit so that deflection of the circuit coil will be uniform throughout the range of temperature normally encountered in use. Such arrangements are familiar to those skilled in this art however and so are not here further described.

A bracket 25 is fitted across the ring 24 and acts to journal a shaft 26 therein. The shaft 26 is connected to and rotatable with the coil 23 and has a gear disk 27 mounted on the outer end thereof.

Gear teeth 28 are formed about the periphery of each of the iris-forming members 12 and these members are so disposed with respect to the gear disk 27 that the peripheral teeth 27a formed on that disk mesh with the teeth formed on the iris members. The galvanometer spring 22 acts to bias the coil 23 and therefore the gear disk 27 in a clockwise direction as the gear 27 is viewed in FIGURE 1. Stop means (not shown) may be provided so that the gear 27 and iris-forming elements 12 can be spring biased no further to that position shown in FIGURE 1. As the intensity of light impinging on the photoelectric cell 14 increases, the coil 23 will be deflected from its spring biased zero position and the gear disk 27 will move with the coil 23 in a counterclockwise direction to rotate the iris-forming elements 12 accordingly. As the iris-forming elements 12 are rotated in this manner the cooperating teardrop apertures 18 gradually define a smaller and smaller diaphragm opening.

My principal contribution resides in the particular mean employed to effect manual adjustment of the iris-forming blades 12. A circular supporting element 30 is mounted for rotatable movement within the camera body and has a wedge-shaped element 31 pivotally mounted therein about a horizontal axis by means of a pair of pivot pins 32 which are journaled in the side walls 33 of a groove 34 formed within the circular support 30.

A bar magnet 35 having a north-south orientation is affixed to an end face of the gear disk 27 across a diameter thereof. A magnet 37 is shown in FIGURE 2 as being suspended by a link 38 from the wedge-shaped element 31 and as being disposed in close proximity to the bar magnet 35 in this suspended position. The magnet 37 also has a north-south orientation along a horizontal plane so that the magnets will mutually bias one another to an aligned position such as is shown in FIGURE 2. A pair of pins 39 serve to pivotally interconnect the link 38 with the wedge-shaped element 31 and the magnet 37.

A seating surface 40 is formed on the member 30 for the wedge-shaped element 31 when it is positioned in the manner shown in FIGURE 2. Since the pin 39 is spaced below the pivot 32 when the element 31 is positioned as shown in FIGURE 2, pivotal movement of the element 31 from that position to the position shown in FIGURE 3 will act to move the magnet 37 upwardly and relatively away from the magnet 35. The magnets 37 and 35 do not have a great deal of strength so that the rotative position of the magnet 37 when it is disposed in the retracted position shown in FIGURE 3 has no appreciable effect on the rotative position of the gear disk 27. The gear disk 27 is then free to rotate in any position under the bias of the galvanometer or galvanometer torsion spring.

When the magnet 37 is dropped to the position shown in FIGURE 2 however the magnet 35 will align itself with the magnet 37 and will rotate as the magnet 37 is rotated in opposition to the bias of the galvanometer or galvanometer spring.

A pointer 41 may be scribed on the element 31 and F-stop indicia 42 can be formed on the camera body or a suitable face plate so that the operator can readily align the pointer with a desired F-stop number. The entire element 30 is free to rotate within the camera body so that when the operator aligns the pointer 41 with a given F-stop number he may do so by rotating the entire element 30. Such rotation of the element 30 will of course act to rotate the magnet 37 which, in turn, will act to rotate the magnet 35 and the gear disk to which it is attached and, in turn, the iris-forming members 12.

It will be understood that in the embodiment of the invention which has been illustrated in the drawings, the magnetic attractive force between the magnets 35 and 37 is simply powerful enough to overcome any opposing bias from the galvanometer. Of course, an arrangement could be provided in which the photoelectric cell-galvanometer circuit is broken when manual actuation of the iris members is desired. Such an arrangement could be provided simply by incorporating a switch in the photoelectric cell-galvanometer circuit which would be actuated in accordance with the pivoted position of the element 31. When the element 31 is in the position shown in FIGURE 2 the photoelectric cell-galvanometer circuit would be broken and when the element 31 is in the position shown in FIGURE 3 the circuit would be closed.

It should also be understood that when the magnet 37 is moved to the position shown in FIGURE 3, the magnetic attractive effect between the magnets is not completely obviated but that it is nullified in the sense that it is of no real effect in determining the rotative position of the gear disk 27.

It will also be understood that this embodiment of my invention has been used for illustrative purposes only and that various modifications and variations in the invention may be effected without departing from the spirit and scope of the novel concepts thereof.

I claim as my invention:

1. In a photographic camera having a film exposing aperture, the improvement of means for controlling the amount of light reaching said aperture which comprises:
   (a) a plurality of rotative members rotatably mounted within said camera;
   (b) edge portions formed on at least two of said rotative members cooperating to define a diaphragm opening;
   (c) wherein rotation of said members is effective to vary the area of the diaphragm opening defined by the said members to thereby vary the amount of light reaching the exposure aperture;
   (d) wherein at least one of said rotary members is magnetically oriented;
   (e) a magnet rotatably mounted within said camera and positionable in close proximity to said magnetically oriented rotary member;
   (f) wherein rotation of said magnet will effect rotation of said magnetically oriented rotary member;
   (g) and means for effecting rotation of said magnet to rotate said magnetically oriented rotary member.

2. In a photographic camera having a film exposing aperture, the improvement of means for controlling the amount of light reaching said aperture which comprises:
   (a) a plurality of rotative members rotatably mounted within said camera;
   (b) edge portions formed on at least two of said rotative members cooperating to define a diaphragm opening;
   (c) wherein rotation of said members is effective to vary the area of the diaphragm opening defined by the said members to thereby vary the amount of light reaching the exposure aperture;
   (d) wherein at least one of said rotary members is magnetically oriented;
   (e) a magnet rotatably mounted within said camera and positionable in close proximity to said magnetically oriented rotary member;
   (f) wherein rotation of said magnet will effect rotation of said magnetically oriented rotary member;
   (g) and means for nullifying the magnetic attractive effect of said magnet on said magnetically oriented rotary member.

3. In a photographic camera having a film exposing aperture, the improvement of means for controlling the amount of light reaching said aperture which comprises:
   (a) a plurality of rotative members rotatably mounted within said camera;
   (b) edge portions formed on at least two of said rotative members cooperating to define a diaphragm opening;
   (c) wherein rotation of said members is effective to vary the area of the diaphragm opening defined by the said members to thereby vary the amount of light reaching the exposure aperture;
   (d) wherein at least one of said rotary members is magnetically oriented;
   (e) a magnet rotatably mounted within said camera and positionable in close proximity to said magnetically oriented rotary member;
   (f) wherein rotation of said magnet will effect rotation of said magnetically oriented rotary member;
   (g) and means for moving said magnet and said magnetically oriented rotary member relatively away from one another to nullify the magnetic attractive effect between said magnet and said magnetically oriented rotary member.

4. In a photographic camera having a film exposing aperture, the improvement of means for controlling the amount of light reaching said aperture which comprises:
   (a) a plurality of rotative members rotatably mounted within said camera having edge portions cooperating to define a diaphragm opening;
   (b) wherein rotation of said members is effective to vary the area of the diaphragm opening defined thereby to vary the amount of light reaching the exposure aperture;
   (c) a bar magnet affixed to the face of one of said rotary members;
   (d) a magnet rotatably mounted within said camera about an axis perpendicular to the said face of said rotary member and positionable in close proximity to said bar magnet;
   (e) wherein rotation of said magnet will effect rotation of said rotary members.

5. In a photographic camera having a film exposing aperture, the improvement of means for controlling the amount of light reaching said aperture which comprises:
   (a) a plurality of rotative members rotatably mounted within said camera having edge portions cooperating to define a diaphragm opening;
   (b) wherein rotation of said members is effective to vary the area of the diaphragm opening defined thereby to vary the amount of light reaching the exposure aperture;
   (c) a bar magnet affixed to the face of one of said rotary members;
   (d) a magnet rotatably mounted within said camera about an axis perpendicular to the said face of said rotary member and positionable in close proximity to said bar magnet;
   (e) wherein rotation of said magnet will effect rotation of said rotary members;
   (f) and means for nullifying the magnetic attractive effect of said magnet on said bar magnet.

6. In a photographic camera having a film exposing aperture, the improvement of means for controlling the amount of light reaching said aperture which comprises:
   (a) a plurality of rotative members rotatably mounted within said camera having edge portions cooperating to define a diaphragm opening;
   (b) wherein rotation of said members is effective to vary the area of the diaphragm opening defined thereby to vary the amount of light reaching the exposure aperture;
   (c) a bar magnet affixed to the face of one of said rotary members;
   (d) a magnet rotatably mounted within said camera about an axis perpendicular to the said face of said rotary member and positionable in close proximity to said bar magnet;
   (e) wherein rotation of said magnet will effect rotation of said rotary members;
   (f) and means moving said magnets relatively apart to nullify the magnetic attractive force of each magnet upon the other.

7. In a photographic camera having a film exposing aperture, the improvement of means for controlling the amount of light reaching said aperture which comprises:
   (a) at least one iris forming member rotatably mounted within said camera and having a portion cooperable with a portion of the camera and effective to define a diaphragm opening;
(b) wherein rotation of said member is effective to vary the area of the diaphragm opening defined thereby;
(c) a pair of elements mounted in spaced relation within the camera for rotation about the same axis;
(d) wherein a magnet is mounted on one of said elements and co-rotatable therewith and the other of said elements is magnetically oriented and wherein rotation of one of said elements when in proximity to the other of said elements will effect rotation of the other of said elements,
(e) means interconnecting one of said elements with said rotary member so that rotation of said connected element will effect rotation of said rotary member; and
(f) means for effecting axial movement of at least one of said elements to provide a means for varying the distance between said elements.

References Cited in the file of this patent
UNITED STATES PATENTS

| | | |
|---|---|---|
| 2,841,064 | Bagby et al. | July 1, 1958 |
| 2,861,506 | Leder et al. | Nov. 25, 1958 |
| 2,966,106 | Schackert | Dec. 27, 1960 |